(12) United States Patent
Kim

(10) Patent No.: US 6,778,706 B1
(45) Date of Patent: Aug. 17, 2004

(54) IMAGE COMPRESSION METHOD FOR VIDEO DECODING BASED ON MOTION COMPENSATION

(75) Inventor: See-Hyun Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 652 days.

(21) Appl. No.: 09/611,944

(22) Filed: Jul. 6, 2000

(30) Foreign Application Priority Data

Jul. 7, 1999 (KR) ........................................ 1999-27187

(51) Int. Cl.$^7$ ................................................. G06K 9/46

(52) U.S. Cl. ........................ 382/232; 382/236; 382/238

(58) Field of Search ................................ 382/232, 236, 382/238, 239, 242, 243, 107; 348/390.1, 394.1, 401.1, 402.1

(56) References Cited

U.S. PATENT DOCUMENTS 5,731,835 A * 3/1998 Kuchibholta ............. 348/390.1

* cited by examiner

*Primary Examiner*—Leo Boudreau
*Assistant Examiner*—Duy M. Dang
(74) *Attorney, Agent, or Firm*—Fleshner & Kim, LLP

(57) ABSTRACT

An image compression method for video decoding based on a motion compensation such as MPEG-2 by using an image compression algorithm in which an image characteristic is differentiated on the basis of a difference between adjacent pels and finally classified by image types by using image characteristic information, and a suitable code word is assigned to each image type, thereby executing an image compression. There is also provided a CDC (classified differential coding) algorithm that defines a bundle by setting up a size of a pel block and searches the values between the adjacent and neighboring pels and its variation pattern, by which the computational complexity is reduced for the image compression coding, while satisfying the random accessibility of the memory.

12 Claims, 3 Drawing Sheets

```
CLASSIFICATION (P₀ ,P₁ ,P₂ ,P₃ ) {

CALCULATE Jᵢⱼ, 0 ≤ i ≤ 2 , 1 < j < 3,
    SWITCH (J₀₁,J₁₂,J₂₃) {
        CASE (0,0,0):Tc=0;         ────── MILD BUNDLE
        CASE (0,0,±):Tc=1;
        CASE (0,±,0):Tc=2;
        CASE (0,±,±):Tc=3;
        CASE (0,±,∓),
             (±,±,0),
             (±,±,±),
             (±,±,∓):Tc=4;         ────── EDGE BUNDLE
        CASE (±,0,0):Tc=6;
        CASE (±,0,±),
             (±,0,∓),
             (±,∓,0),
             (±,∓,∓):Tc=7;
        CASE (±,∓,±):Tc=10;        ────── RANDOM BUNDLE
    }
}
```

FIG. 1

```
CLASSIFICATION (P_0, P_1, P_2, P_3) {

CALCULATE J_ij, 0 ≤ i ≤ 2, 1 < j < 3,
    SWITCH (J_01, J_12, J_23) {
    CASE (0,0,0):Tc=0;          ──────── MILD BUNDLE
    CASE (0,0,±):Tc=1;     ┐
    CASE (0,±,0):Tc=2;
    CASE (0,±,±):Tc=3;
    CASE (0,±,∓),
         (±,±,0),
         (±,±,±),
         (±,±,∓):Tc=4;          ──────── EDGE BUNDLE
    CASE (±,0,0):Tc=6;
    CASE (±,0,±),
         (±,0,∓),
         (±,∓,0),
         (±,∓,∓):Tc=7;     ┘
    CASE (±,∓,±):Tc=10;         ──────── RANDOM BUNDLE
    }
}
```

FIG. 3A
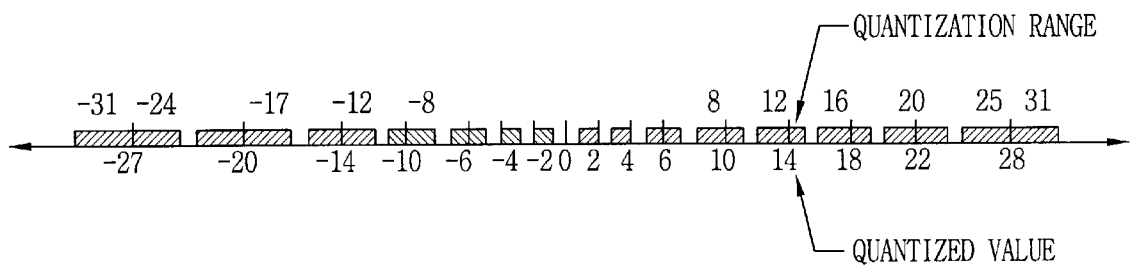
FIG. 3B
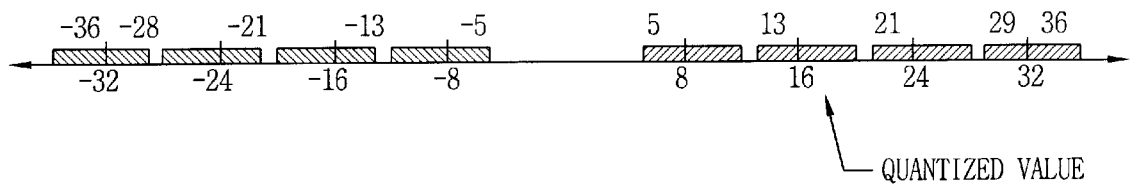
FIG. 4
| CODE TYPE | CODE WORD CONFIGURATION |
|---|---|
| 0 | Tc(4)-Ca(8)-Cp(4)-Cp(4)-Cp(4) |
| 1 | Tc(4)-Ca(6)-Cp(4)-Cp(4)-Ca(6) |
| 2 | Tc(4)-Ca(6)-Cp(4)-Ca(6)-Cp(4) |
| 3 | Tc(4)-Ca(8)-Cp(4)-Cs(8) |
| 4 | Tc(4)-Ca(6)-Cs(8)-Ca(6) |
| 6 | Tc(4)-Ca(6)-Ca(6)-Cp(4)-Cp(4) |
| 7 | Tc(4)-Ca(6)-Ca(6)-Cs(8) |
| 10 | Tc(4)-Ca(5)-Ca(5)-Ca(5)-Ca(5) |
| 11 | Tc(4)-Ca(7)-Cp(4)-Cc(3)-Cs(6) |
| 12 | Tc(3)-Ca(6)-Cc(3)-Cs(6)-Ca(6) |
| 14 | Tc(3)-Ca(6)-Ca(6)-Cc(3)-Cs(6) |

IMAGE COMPRESSION METHOD FOR VIDEO DECODING BASED ON MOTION COMPENSATION

BACKGROUND OF THE INVENTION

1. Field of the Invention

The present invention relates to an image compression method, and more particularly, to an image compression method for video decoding based on a motion compensation such as MPEG-2 by using an image compression algorithm in which an image characteristic is differentiated on the basis of a difference between adjacent pels and finally classified by image types by using image characteristic information, and a suitable code word is assigned to each image type, thereby executing an image compression.

2. Description of the Background Art

Decoding of a video bit stream such as MPEG-2 requires lots of memory to compensate the motion from the reference picture. Thus, a classified differential coding (CDC), a simple image compression algorithm, has been proposed as a way to reduce the frame buffer memory.

Generally, motion estimation (ME) along with the inverse discrete cosine transform (IDCT) has gained wide acceptance as a powerful technique to compress the motion video.

In order to decode the MPEG-2 video, at least two pictures need to be stored as the reference frame for the motion compensation (MC). Roughly, it amounts to 8.9 M bytes in the high definition (HD) decoding. Therefore, implementation of an MPEG-2 video decoder requires an image compression algorithm which could enable the developers to use less memory without sacrificing the decoded picture quality.

In the image compression method, simplification of computation and efficiency and easiness in data access are critical.

Conventionally, as the image compression method, a tree-structure vector quantization (TSVQ) technique, a pyramid vector quantization(PVQ) technique or a variable length coding(VLC) technique have been proposed.

However, the TSVQ technique disadvantageously includes a complicate operation such as codebook search. The PVQ requires a complicate arithmetical operation such as division, which causes more hardware, much execution time and design effort. In case of the VLC, its random accessibility is not good. Thus, these techniques fail to meet the need of simplification of computation and efficiency and easiness in data access.

SUMMARY OF THE INVENTION

Therefore, an object of the present invention is to provide an image compression method-which is capable of reducing computational complexity for image compression coding and of satisfying a random accessibility by providing a CDC (classified differential coding) algorithm having a high random accessibility and a low hardware complexity in video decoding based on motion compensation such as MPEG-2.

In the present invention, in order to compress an image, a difference between adjacent two pels is computed and an image region is divided into a mild region, an edge region and a random pattern region for which different code words are assigned. Especially, a bundle is defined by setting up a size of a pel block, an image characteristic is determined by searching values between adjacent and neighboring pels and its variation pattern, and a corresponding region suitable to each image characteristic is assigned with a suitable code word by bit allocation, thereby compressing an image.

To achieve these and other advantages and in accordance with the purpose of the present invention, as embodied and broadly described herein, there is provided an image compression method including the steps of: determining an image bundle type; and giving a cord word to the determined image bundle type by an appropriate bit allocation.

In the image compression method of the present invention, in the step of determining an image bundle type, an image is divided into a mile region and an edge region on the basis of visual characteristics (factors that affects an image recognition) of human beings, and characteristic of the image is finally determined on the basis of a difference between adjacent or neighboring pels of each region and its variation pattern, to thereby assigning an suitable code word corresponding to the variation pattern of each pel by a bit allocation.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is an exemplary view of bundle type of the image compression method in accordance with the present invention;

FIGS. 3A and 3B are exemplary views of quantization technique of the image compression method in accordance with the present invention; and FIG. 4 is an exemplary view of a coding table of the image compression method in accordance with the present invention.

DETAILED DESCRIPTION OF THE PREFERRED EMBODIMENTS

Figure 2A:
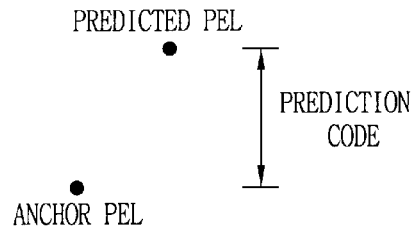
FIGS. 2A, 2B and 2C are exemplary views of giving a code of the image compression method in accordance with the present invention.

Reference will now be made in detail to the preferred embodiments of the present invention, examples of which are illustrated in the accompanying drawings.

In the MPEG technique, inherently images contains lots of mild regions, where the correlation between adjacent pels are very high. With differential coding or vector quantization, we can obtain a fairly high coding gain for such regions. However, it is well known that the regions of the high spatial frequency, such as edges, are usually critical to the human visual system. Pictures of higher SNR might look even worse if it fails to keep the edge information. Although the edge region is not a majority in a whole picture, it should be treated with special care to preserve the picture quality. But in contrast to edges, the region of a random pattern is less sensitive to the coding noise as long as the pattern is not impaired.

By applying different coding schemes depending on the type of the region, an image can be compressed without introducing noticeable degradation in the picture quality.

Specifically in MPEG-2 video, an 8×8 pels named 'block' is the processing unit for ME and IDCT Since the motion compensation requires a block of pels in any position of the reference picture, the random accessibility should be supported with the reasonable penalty.

The image compression method in accordance with the present invention will now be explained with reference to the accompanying drawings.

A bundle is defined by 4 pels wide by 1 pel long. The reason for the definition of this size is based in consideration that if the pel block is too large, its characteristic is hardly noticeable, while if it is too small, its coding gain is degraded.

First, by obtaining a difference between adjacent pels in the bundle, it is judged whether the bundle type is mild, edge or random pattern.

For example, by comparing the difference between the adjacent pels with a reference value (Th), if the difference between the adjacent pels is greater than the reference value, it falls on the case that value variation between the adjacent pels is large and thus it is considered to be the edge bundle or random pattern bundle, or otherwise, it is considered to be the mild bundle.

In this manner, the bundle type is determined by computing the difference between the adjacent two pels. In this respect, a jump indicator ($J_{ij}$) is defined on the basis of the difference between the pels. The jump indicator is critical information in a sense that it reflects how the pel value is varied.

FIG. 1 is an exemplary view of bundle type of the image compression method in accordance with the present invention.

As shown in the drawing, one bundle is defined by having four pels ($p_0$, $p_1$, $p_2$ and $p_3$; $p_i$, $0 \leq i \leq 3$), of which $p_0$ is the leftmost pel and $p_3$ is rightmost pel.

By comparing the difference between the adjacent pels ($p_0-p_1$, $p_1-p_2$ and $p_2-p_3$) with a jump threshold value, a predetermined reference value ($J_T$), (a) in case that $p_j-p_i>J_T$, $J_{ij}$='+' (the pel value is increased more than the predetermined reference value)

(b) in case that an absolute value $|p_j-p_i| \leq J_T$, $J_{ij}$='0' (there is little variation in the pel value)

(c) in case that $p_j-p_i<-J_T$, $J_{ij}$='−' (the pel value is decreased more than the predetermined reference value).

In case that all pels in a bundle are close to each other, the bundle is identified to be mild, i.e., $J_{01}=J_{12}=J_{23}=0$. If $J_{01}=\pm$, $J_{12}=\pm$, $J_{23}=\pm$, a bundle is considered to be random. In other cases, they are classified to be edge bundles.

Accordingly, by obtaining the jump indicators ($J_{01}$, $J_{12}$ and $J_{23}$) for the adjacent pels and by observing how it is varied to a value, its bundle type can be classified as the mild bundle, the edge bundle or the random bundle. The mild bundle and the random bundle can be subdivided into one code type, while the edge bundle can be subdivided into 12 code types. And, as shown in FIG. 1, 8 code types (Tc) can be assigned to each bundle type.

The above procedure is also performed for the adjacent pels in a bundle, so that a final type of a bundle and how much a pel value is varied and to which form a pel value is varied in the bundle, that is, a final characteristic of the image, are determined.

To be described in detail later, the bundle is coded by a code type (Tc) and a code word (Cw). The code type is determined by the pattern of the bundle, which specifies the configuration of the code word. The code word is a bit stream encoding a bundle in different ways depending on the code type.

Since the mild bundle and the random bundle are less critical to human eyes, each one is mapped to one code type, respectively.

As described above, the jump indicator is obtained from the difference between the adjacent or neighboring pels, based on which the bundle types are classified and 8 code types are determined for each case corresponding to each bundle type.

To the thusly determined code type, a code word suitable to each characteristic is selected for use. In the present invention, a code suitable to the image characteristic is selected among an anchor code (Ca), a code of anchor pel, a prediction code (Cp), a slope code (Cs) and a slope compensation code (Cc), and a bit is suitably allocated to each code, thereby completing a compression coding.

Figure 2B:
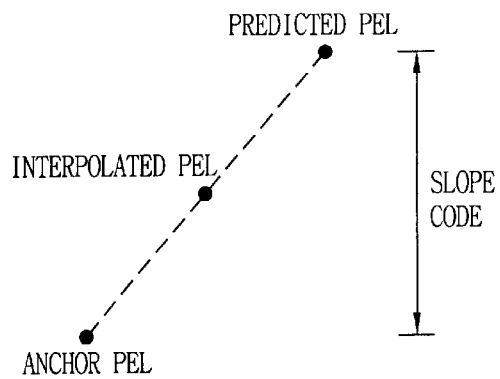
Figure 2C:
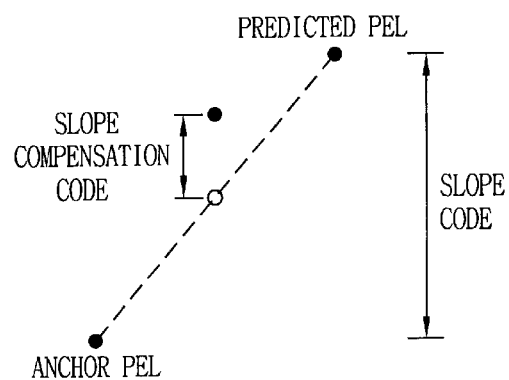

FIGS. 2A, 2B and 2C are exemplary views of giving a code of the image compression method in accordance with the present invention.

With reference to FIG. 2A, the prediction code is the difference between the predicted pel and its anchor pel. With reference to FIG. 2B, in case that an interpolated pel comes in a predetermined range between the anchor pel and the prediction pel, the slope between the anchor pel and the prediction pel is assigned as a code value (Cs). With reference to FIG. 2C, in case that the compensated and reconstructed pel does not come in the slope range, the difference between the two is assigned as a slope compensation code (Cc).

On the basis of the variation (varying degree and orientation) in the values betwteen the adjacent pels or neighboring pels, the code types (Tc) are subdivided into 8 types as shown in FIG. 1, and the following three cases are additionally searched for the anchor pel (Pa) and interpolated pel (Pi) and the code type (Tc) so that 3 code types (Tc) are additionally assigned.

That is, in case that $Cs=p_s-p_a$, $Qi=p_a+Cs/2$,

When Tc=3, if the absolute value $(p_i-q_i)>E_{i, max}$, the code type is changed so that Tc=11, When Tc=4, if the absolute value $(p_i-q_i)>E_{i, max}$, the code type is changed so that Tc=12, When Tc=7, if the absolute value $(p_i-q_i)>E_{i, max}$, the code type is changed so that Tc=14.

Where, qi is a reconstructed value of the interpolated pel pi, and $E_{i, max}$ is the maximum allowance error.

FIG. 3A illustrates a quantization range for the prediction code and a mapped quantized value (Qp), and FIG. 3B illustrates a quantization error for a code according to the slope compensation and a quantized value (Qc).

The above procedure will now be described in detail.

For the mild bundle (Tc=0), the leftmost pel would be the anchor pel, and other three pels are predicted from its left pel. In this case, the code word is composed of one anchor code (Ca) and three prediction codes (Cp), which are the quantized difference between the current pel and its left pel. The anchor code has the full precision, 8 bits, while each prediction code has 4 bits. The quantizer used for finding a prediction code is shown in FIG. 3A. The quantization error, Ep, is bounded as follows: $-4 \leq Ep>4$.

With reference to FIG. 3A, the prediction quantization error Ep comes in the range of $-4 \leq Ep>4$, and with reference to FIG. 3B, the quantization error comes in the range of $-4 \leq Ep>4$.

That is, in FIG. 3A, the above data represents the quantization range, while the below data represents the quantized value. For example, in a quantization range of −31 and −24, a prediction quantized value becomes −27, of which prediction quantization error is below 4.

The edge bundles usually have two anchor pels, and the other two pels in the bundle are predicted from the anchors. In some edge bundles (e.g., Tc=3, 4, 7), it's not always possible to encode effectively four pels with two anchors. For example, considering that a bundle of which code type is 3, the leftmost pels would be the first anchor and the second pel can be predicted within the error bound of Ep. However, the third and the fourth pel can not be represented with one anchor and one prediction because the magnitudes of the two pels are quite different from its left pel. Thus, those bundles need to be represented with the slope and, optionally, the slope compensation. The following pseudo code shows when the slope compensation code is needed.

Slope compensation $(p_a, p_i, p_s, T_c)\{$

```
Cs = p_s - p_a
q_i = p_a + Cs/2
If (| p_i - q_i | > E_{i, max}) {
    Switch (Tc) {
        case 3 : Tc = 11;
        case 4 : Tc = 12;
        case 7 : Tc = 14;
    }}}
``` where $q_i$ is a reconstructed value of the interpolated pel, $p_i$, and $E_{i, max}$ is the maximum allowable error for $p_i$. When the quantization error ixceeds the error bound $E_{c, max}$, the bundle type reduces to be random, i.e., Tc=10.

FIG. 4 shows the configuration of the code word and bit allocation depending on the bundle type. As noted, the random bundle (Tc=10) is coded into four anchors of 5 bit and the maximum error is less than or equal to 4.

In this manner, in the present invention, total 11 code types are determined, to each of which 4 bit allocation is made, thereby completing compressive coding.

That is, in case that the code type Tc=0, the bundle type becomes the mild, for which 4 bit is allocated for the code type (Tc), 8 bit is allocated for the anchor code (Ca), and 4 bit is allocated for the three prediction codes (Cp).

In case that the code type Tc=1, the bundle type becomes the edge, for which 4 bit is allocated for the code type (Tc), 6 bit is allocated for the anchor code (Ca), and 4 bit is allocated for the two prediction codes (Cp).

In the same manner, with the other remaining code types, suitable bits are allocated for the code type (Tc), the anchor code (Ca), the prediction code (Cp), the slope code (Cs) and the slope compensation code (Cc), so that an image compression data can be finally obtained.

As so far described, according to the image compression method of the present invention, the image compression coding is performed by using the CDC algorithm, so that the computational complexity required for data compression is reduced, random accessibility of the memory can be obtained. And, an image compression method suitable to the VLSI of video decoding system based on a motion compensation such as MPEG-2 can be provided.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An image compression method based on a motion compensation, comprising:
   determining an image as a bundle, a sub-block unit of a predetermined size, and classifying a bundle type in consideration of an image characteristic on the basis of the difference value between adjacent or neighboring pels in the bundle; and
   designating a code type for each bundle type, allocating bits by combining at least two among an anchor code (Ca), a prediction code (Cp), a slope code (Cs) and a slope compensation code (Cc) and coding the bundle, wherein in the classifying the bundle type, the difference between the adjacent pels and a jump threshold value are compared to obtain a jump indicator value, based on which the bundle type is classified into a mild bundle, an edge bundle and a random pattern bundle.

2. The method according to claim 1, wherein as for the mild of the bundle types, an interval between pels is '0'.

3. The method according to claim 1, wherein, in coding, a prediction quantized error is less than 4.

4. The method according to claim 1, wherein a bit allocation is made by giving a code word corresponding to a pattern of each pel variation.

5. The method according to claim 1, wherein the prediction code is the difference between a predicted pel and its anchor pel, the slope code is a slope between the anchor pel and the predicted pel in case that an interpolated pel comes in a predetermined range between the anchor pel and the predicted pel, and the slope compensation code is a code in case that a pel compensated in the slope code is beyond the predetermined range.

6. The method according to claim 1, wherein, in the coding, 32-bit data is compressed to 24-bit data.

7. The method according to claim 1, wherein the image compression method makes use of a CDC (classified differential coding) algorithm.

8. The method according to claim 1, wherein the bundle is one-dimensional sub-block of m=n pels of which m=4 and n=1.

9. The method according to claim 1, wherein the bundle type is classified into a mild bundle and a random pattern bundle that are relatively less sensitive to the human visual system, and an edge bundle that is relatively sensitive to the human visual system, for which encoding is performed, respectively, in combination of the codes.

10. The method according to claim 9, wherein the mild bundle and the random pattern bundle are mapped in a single code type, respectively, while the edge bundle is mapped by allocating bits in combination of at least two of an anchor code, a prediction code, a slope code and a slope compensation code, corresponding to the variation in the value of the adjacent pels and the variation orientation.

11. An image compression method based on a motion compensation, comprising:
   determining an image as a bundle, a sub-block unit of a predetermined size, and classifying a bundle type in consideration of an image characteristic on the basis of the difference value between adjacent or neighboring pels in the bundle; and
   designating a code type for each bundle type, allocating bits by combining at least two among an anchor code (Ca), a prediction code (Cp), a slope code (Cs) and a slope compensation code (Cc) and coding the bundle, wherein the prediction code is the difference between a predicted pel and its anchor pel, the slope code is a slope between the anchor pel and the predicted pel in case that an interpolated pel comes in a predetermined range between the anchor pel and the predicted pel, and the slope compensation code is a code in case that a pel compensated in the slope code is beyond the predetermined range.

12. An image compression method based on a motion compensation, comprising:

determining an image as a bundle, a sub-block unit of a predetermined size, and classifying a bundle type in consideration of an image characteristic on the basis of the difference value between adjacent or neighboring pels in the bundle; and designating a code type for each bundle type, allocating bits by combining at least two among an anchor code (Ca), a prediction code (Cp), a slope code (Cs) and a slope compensation code (Cc) and coding the bundle, wherein the bundle type is classified into a mild bundle and a random pattern bundle that are relatively less sensitive to the human visual system, and an edge bundle that is relatively sensitive to the human visual system, for which encoding is performed, respectively, in combination of the codes.

* * * * *